United States Patent [19]

Christiansen

[11] Patent Number: 4,995,434

[45] Date of Patent: Feb. 26, 1991

[54] WOODWORKING LATHE TAILSTOCK ASSEMBLY

[76] Inventor: Clead M. Christiansen, 3086 N. 150 East, North Ogden, Utah 84414

[21] Appl. No.: 391,154

[22] Filed: Aug. 8, 1989

[51] Int. Cl.[5] .......................... B27C 7/04; B27C 7/06; B23B 23/04; B23B 43/02

[52] U.S. Cl. .......................................... 142/48; 142/53; 82/1.11; 82/148; 82/157; 82/171

[58] Field of Search ................ 82/1.11, 148, 150, 157, 82/171; 142/48, 49, 53, 55

[56] References Cited

U.S. PATENT DOCUMENTS

| | | | |
|---|---|---|---|
| 559,695 | 5/1896 | Wells et al. | 142/53 |
| 1,503,836 | 8/1924 | Kunzer | 82/152 |
| 1,587,261 | 6/1926 | White | 82/117 |
| 2,224,480 | 12/1940 | Kartarik | 408/81 |
| 2,368,032 | 1/1945 | McConnell | 82/148 |
| 2,453,825 | 11/1948 | Wright | 82/148 |
| 2,619,993 | 12/1952 | Lombard | 82/148 |
| 3,319,527 | 5/1967 | Pipes | 82/148 |
| 3,376,769 | 4/1968 | Garvin | 82/148 |
| 3,996,823 | 12/1976 | Guillermier | 82/1.11 |
| 4,893,532 | 1/1990 | Walburn et al. | 82/148 |

FOREIGN PATENT DOCUMENTS

| | | | |
|---|---|---|---|
| 513697 | 2/1921 | France | 142/53 |

*Primary Examiner*—William E. Terrell
*Attorney, Agent, or Firm*—A. Ray Osburn

[57] ABSTRACT

A tailstock assembly for a wood-turning lathe which facilitates the drilling of deep bores into long slender wooden workpieces. The tailstock includes a chuck grasping the tail end of the workpiece, said chuck having an axial center bore therethrough providing a guide for a drill inserted therein to make the bore.

5 Claims, 3 Drawing Sheets

WOODWORKING LATHE TAILSTOCK ASSEMBLY

BACKGROUND OF THE INVENTION

1. Field

The field of the invention is workworking lathe components, and more particularly such components employed for boring deep holes in elongate workpieces.

2. State of the Art

Boring large length-to-diameter holes lengthwise into slender wooden workpieces with a high degree of straightness and directional control has long been regarded as very difficult. Generally, such long small holes are employed in dimensionally uncritical bulky objects, where crookedness and erratic direction is not objectionable. For lathe turned products, the workpiece is commonly gripped cantilevered from its head end from a chuck mounted in the lathe headstock.

An appropriately sized drill bit is installed, also cantilevered, in a chuck mounted on a sliding shaft carried by the lathe tailstock. The shaft is urged toward the headstock, pressing the cutting end of the bit into the projecting end of the workpiece. Since both the workpiece and the drill bit are only gripped at one end, both are subject to deflection during the drilling operation. The locations of the drill bit and the workpiece could be exchanged, with the latter being urged against the former as it rotates. However, the same shortcomings exist. These methods work well for spool spindle holes, wheel axle bores, and other short bores, but are unsatisfactory for long slender bores, requiring long slender drill bits, especially when the workpieces are similarly proportioned, as often is the case. Limberness of both workpiece spindles and bits, always aggravated by deflection of the latter by variations in wood grain direction and hardness, combine to generally prevent the drilling of reasonably straight, accurately directed, small deep bores. Examples include the small diameter deep holes required in turned writing pen barrels, upstanding lamp posts and the like.

BRIEF SUMMARY OF THE INVENTION

With the foregoing in mind, the shortcomings and disadvantages in prior art apparatus and methods for center boring long slender wooden workpieces are eliminated or substantially alleviated in the present invention. The invention comprises a lathe tailstock assembly, and method for its use in conjunction with a wood-turning lathe. The tailstock is adapted to chuck the tail end of an elongate wood workpiece, its head end being similarly chucked to the lathe headstock. The tail end chuck is bearing mounted on the tailstock, to rotate at selective height above the lathe bed. The tailstock is selectively positioned upon the ways, to assure the axis of rotation of its chuck coincides with that of the headstock chuck. A drill bit guide bore extends axially through the tailstock chuck, sized for close sliding fit with the bit shank. The workpiece spindle is thus supported at both tail and head ends, and is axially aligned with the bit guide bore. For drilling, the cutting end of the bit is guided by the bore into the tail end of the spindle. The spindle deflection is virtually eliminated. Only the necessary length of the drill bit is unsupported at each instant during the drilling, reducing its effective limberness. These factors combine to facilitate the drilling of deeper, smaller bores with improved accuracy.

It is therefore a principal object of the invention to provide a wood-turning lathe tailstock assembly which is capable of producing small, deep bores of greater accuracy than has heretofore been possible.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
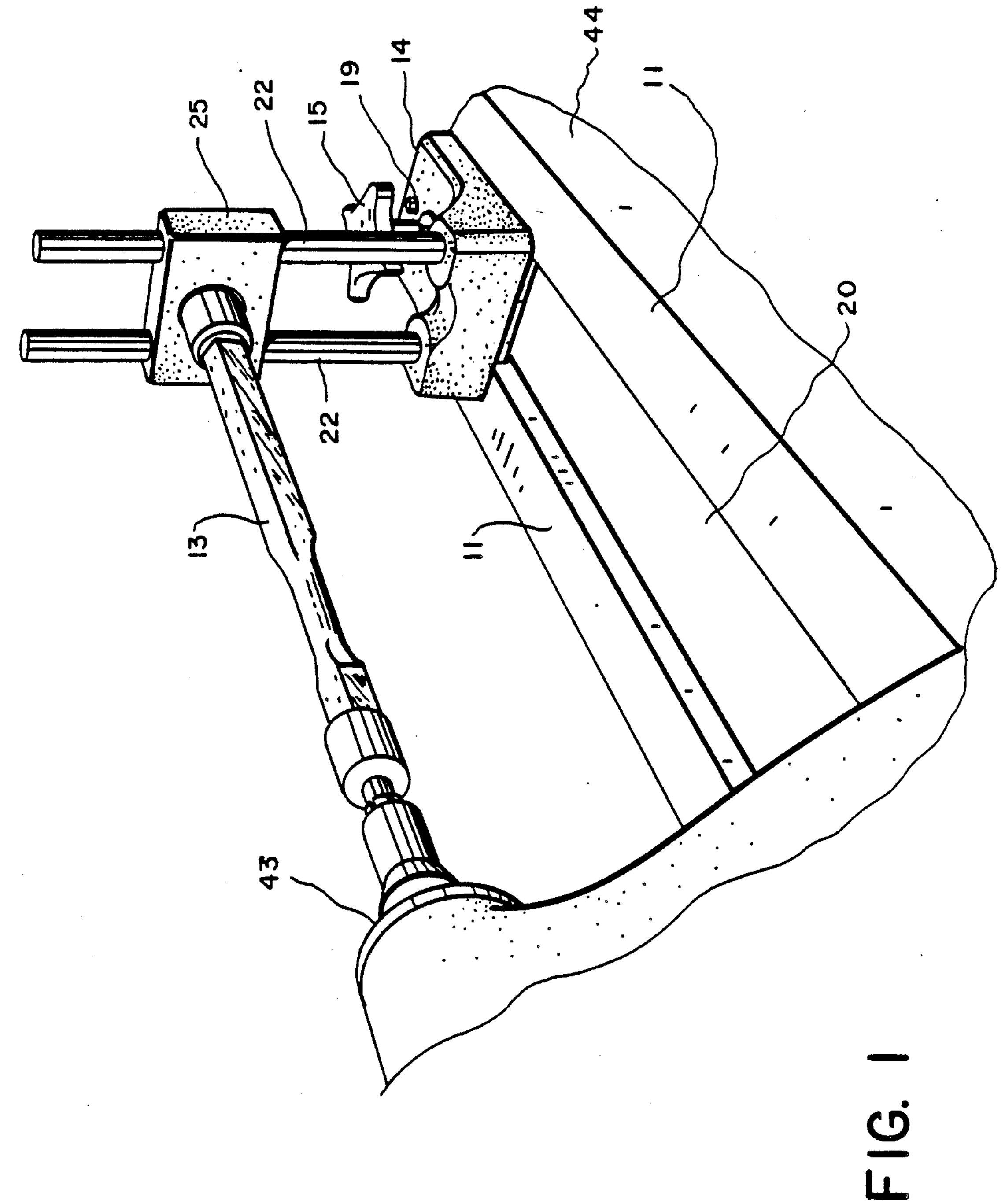
FIG. 1 is a perspective view of a lathe tailstock shown installed upon the bed of a wood-turning lathe with a wooden spindle workpiece, drawn to a reduced scale, FIG. 2 a side elevation view of fragments of the tailstock, workpiece and lathe of FIG. 1, taken along line 2—2 thereof, partially cut away, drawn to substantially full scale, and FIG. 3 an elevation view of a fragment of tailstock of FIG. 1, taken along line 3—3 thereof, drawn to the scale of FIG. 2.
Figure 2:
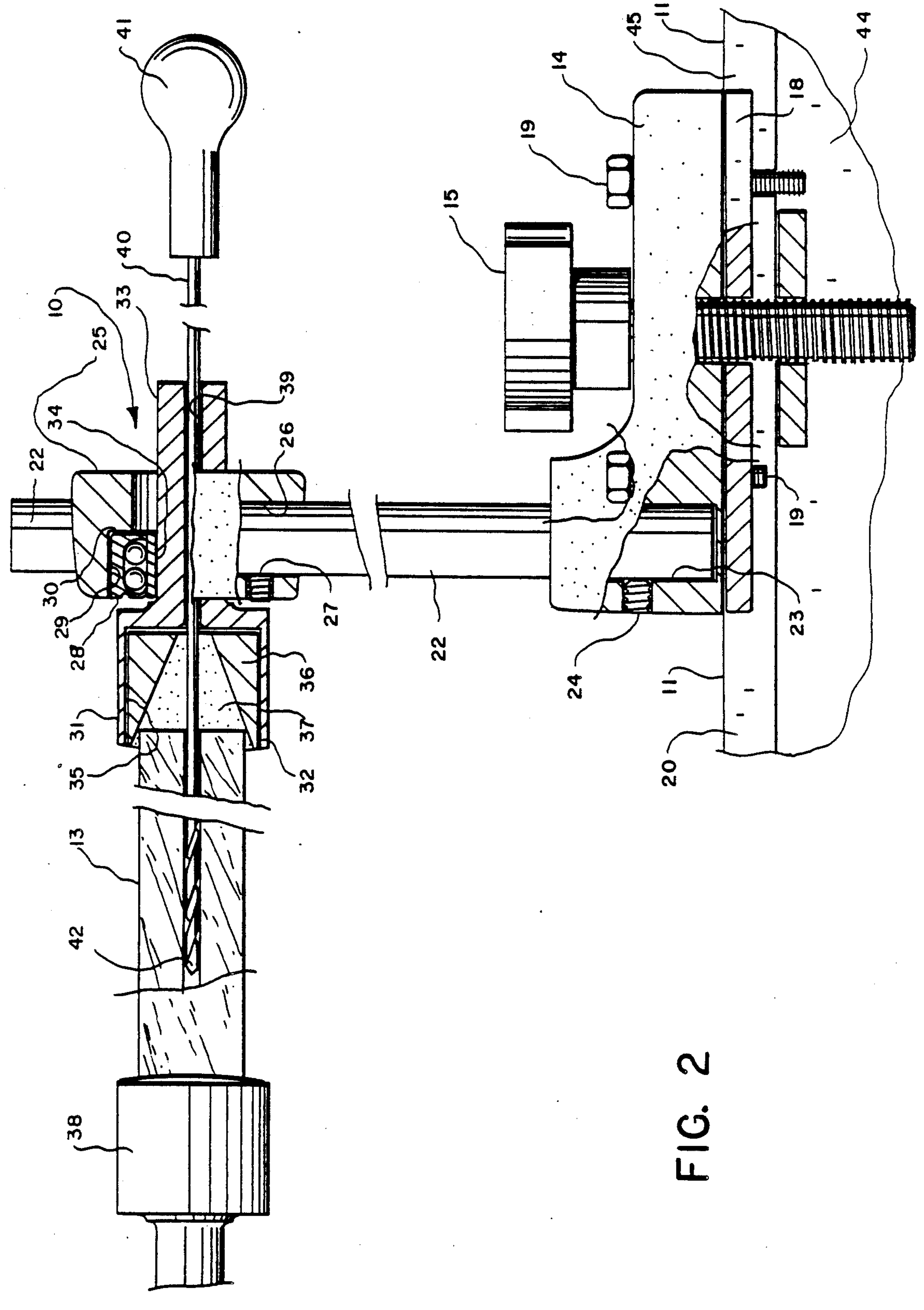

A lathe tailstock assembly 10 in accordance with the invention is shown in FIG. 1 installed upon the ways 11 of a wood-turning lathe 12. A wood spindle workpiece 13 is shown in position for center drilling and exterior contouring.

Figure 3:
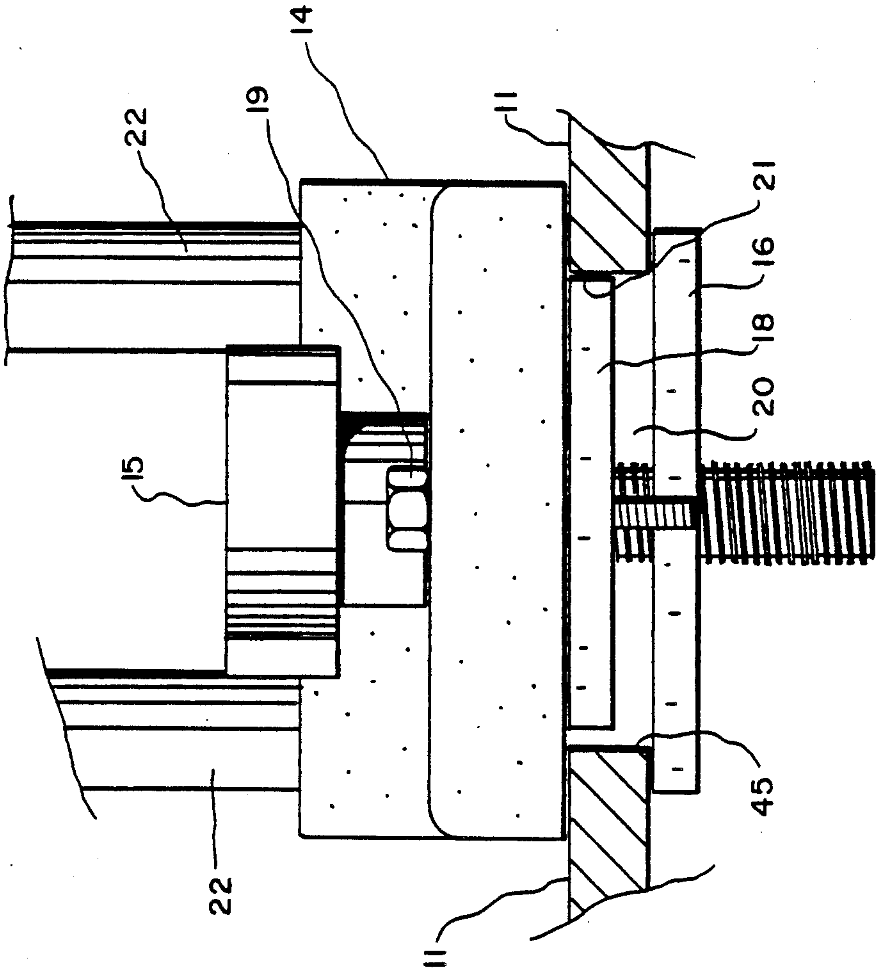

Tailstock assembly 10 comprises base member 14 which is clamped to the ways 11 of lathe 12. A locking knob and screw assembly 15 cooperates with a retainer plate 16 which engages the bottom of lips 17 of ways 11. (FIG. 3) A gap spacer and positioning plate 18, secured to base 14 by a pair of screws 19 fits into the way gap 20, with one side 21 against the edge of one of the ways 11 to maintain proper alignment of tailstock 10. A pair of cylindrical rods 22 are mounted in vertical bores 23 through base plate 14, retained by set screws 24 acting against a machined flat area on each rod. A tailstock bearing block assembly 25 carries a pair of parallel vertical bores 26 accepting the vertical rods 22. Upper set screws 27 secure bearing block 25 to rods 22 in selected vertical position.

Installed between vertical rods 22 in bearing block 25 is a two row ball bearing assembly 28 pressed into a bore 29 to bottom against shoulder 30. A tailstock chuck drive assembly 31 comprises an enlarged head 32 and an elongate shank 33. The outside diameter of shank 33 is sized for close sliding fit with the center bore 34 of bearing 28. Pressed into a bore 35 of head 32 of square drive center 31 is an insert 36 with an outwardly opening, four sided pyramidal cavity 37. The ends of square spindle workpieces of various sizes are accommodated by tapering cavity 37. A similar headstock square drive center assembly 38 installed into the drive of the lathe headstock similarly grips the head ends of the spindle workpieces.

A longitudinal bore 39 is provided axially through shank 33 and head 32 of square drive center 31, joining with the apex of pyramidal cavity 37. Bore 39 is sized for close sliding clearance with a large length-to-diameter ratio drill bit 40. A knob 41 may be provided on the shank end of bit 40 to serve as a handle.

In operation of tailstock 10, cutting end 42 of drill bit 40 is pressed against the tail end of spindle 13, with the spindle, headstock drive center and tailstock drive center all rotating under power applied through the lathe headstock assembly 43. Precise alignment of headstock drive, spindle and tailstock drive is essential for accurate boring of the deep center hole.

Before installation of tailstock assembly 10, the lathe headstock 43 and the lathe tailstock (not shown) are adjusted as necessary by normal procedures to be accurately aligned. The lathe tailstock is then moved toward the tail end of the lathe bed 44. The headstock assembly 10 may then be installed loosely clamped and assembled upon the ways 11. Drill bit 40 (without handle knob 41) is inserted through bore 39 to project from both of its ends. Tailstock 10 is moved along the ways until one end of bit 40 is in close proximity to the lathe headstock spur center (not shown). The lathe tailstock is moved until its spur center is very near the other end of bit 40. Vertical, lateral and angular adjustments are made as necessary to align bit 40 with both the lathe headstock 43 spur center and the lathe tailstock live center. Adjustments include vertical positioning of bearing block 25 on vertical rods 22, secured by tightening of set screws 27, and lateral and rotational positioning of base 14 on ways 11. Then, gap spacer plate 18 is secured tightly against base 14, using screws 19, with one of its edges 21 against an inside edge 45 of one of the ways 11. This procedure assures correct rotational and lateral orientation of tailstock 10 wherever it must be positioned along bed 44 to permit installation of a workpiece spindle 13 between square guide centers 31 and 38. Lock assembly 15 may then be tightened, causing retainer plate 16 to grip the under surfaces of ways 11.

With the guide centers, the workpiece spindle and the drill bit guide bore all precisely aligned, the cutting end 42 of drill bit 40 may then be inserted through bore 39 and urged incrementally into the tail end of rotating spindle 13. Since the drill bit flutes extend only a short distance on the shank (for maximum drill stiffness), the bit must be withdrawn frequently to clear the bore of wood dust and shavings. The straightness of the resulting bore remains effected by the condition of the wood grain and the skill of the operator. However, the firm support of the workpiece at both ends greatly improves the drilling accuracy, as does the guiding of bit 40 by bore 39, and the accurate alignment of bit and spindle. Also very beneficial is the shortening of the average unsupported length of drill bit 40 during drilling. At each point during the drilling, only the necessary portion extends unsupported beyond guide bore 39. This reduces the average limberness of the working portion of the bit, with concomitant reduction in shank deflection. The net result of these factors is greatly improved accuracy over present methods of deep hole drilling into wood workpieces.

The invention may be embodied in other specific forms and steps without departing from the spirit or essential characteristics thereof. The present embodiments and method is therefore to be considered in all respects as illustrative and not restrictive, the scope of the invention being indicated by the appended claims rather than by the foregoing description, and all changes which come within the meaning and range of equivalency of the claims are therefore intended to be embraced therein.

That is claimed and desired to be secured by United States Letters Patent is:

1. A tailstock assembly for a wood-turning lathe, said lathe having a horizontal bed and a headstock assembly including a rotatable chuck for gripping the head end of a wooden spindle workpiece or the like, the tailstock assembly comprising:

a rotatable chuck adapted to retain the tail end of the workpiece and having a drill bit guide bore therethrough along its axis of rotation; and means for securing the chuck selectively positioned along the bed with the axis of rotation of the chuck aligned with that of the headstock chuck; wherein the lathe includes a pair of parallel horizontal ways and the selective position chuck securing means comprises:

releasable clamping means carried by the tailstock assembly for its attachment upstanding from the ways in selective longitudinal, lateral, and rotational positions thereon; wherein the tailstock includes means for positioning the chuck upon the tailstock elevated at selective elevated at selective distances above the ways.

2. The tailstock assembly of claim 1, wherein the releasable clamping means comprises:

a base member with a flat horizontal bottom surface;

a spacer plate sized to fit loosely within the gap between the ways and having at least one straight edge, along with at least one screw for its securement to the bottom of the base member in selective lateral and rotational position; and a clamping plate sized to span the gap between the ways to bear upwardly upon the bed beneath the ways, along with at least one screw acting between the clamping plate and the base member to secure the tailstock assembly in selective position along the ways.

3. The tailstock assembly of claim 2, wherein the selective chuck positioning means comprises:

at least one vertical member upstanding from the base member;

a bearing block carrying the chuck rotatably within a horizontal bore therethrough; and means securing the bearing block to the upstanding vertical member at selective elevational positions thereon.

4. The tailstock assembly of claim 3, wherein:

the rotatable chuck comprises a head end portion adapted to grip the tail end of the workpiece and an elongate stem portion extending rearwardly therefrom; and the bearing block carries within the horizontal bore a shaft bearing sized to accept the stem of the chuck.

5. The method of boring a large length-to-diameter hole into a wooden workpiece to a desired depth comprising the steps:

providing a wood-turning lathe having a horizontal bed, and a lathe headstock assembly having a spur center and including a rotatable chuck for gripping the head end of a wooden spindle workpiece;

providing tailstock assembly including a rotatable chuck for gripping the tail end of the workpiece, said chuck having a drill bit guide bore therethrough along its axis of rotation, the tailstock assembly further including means for securing the chuck selective position along the bed with the axis of rotation of the chuck aligned with that of the lathe headstock chuck;

providing a drill bit with a cutting portion at one end and a shank of sufficient length for boring a hole of the desired depth into the workpiece, the cutting end and shank being sized for a close sliding fit within the drill bit guide bore through the chuck;

aligning the chuck of the tailstock assembly until the guide bore is aligned with the lathe headstock spur;

positioning and securing the tailstock assembly along the bed with the workpiece gripped at head and tail ends by the headstock chuck and the tailstock chuck of the tailstock assembly respectively;

rotating the workpiece by means of the lathe;

inserting the cutting head of the drill bit through the drill bit bore, pressing it against the end of the workpiece to make the desired bore, and withdrawing the bit as necessary to remove wood dust and shavings; and repeating the immediately previous step until the bore in the workpiece reaches the desired depth.

* * * * *